(12) United States Patent
Kallsen et al.

(10) Patent No.: US 6,402,798 B1
(45) Date of Patent: Jun. 11, 2002

(54) TWIST AND LOCK FILTER HOUSING WITH NONTORSIONAL ANTI-ROTATION STOP

(75) Inventors: Kent J. Kallsen, Oregon; Nels A. Nordstrom, McFarland; Mark V. Holzmann; Jeffrey S. Morgan, both of Stoughton; Jeffrey S. Rech, Verona; Thomas M. Anderson-Brown, Madison, all of WI (US)

(73) Assignee: Nelson Industries, Inc., Stoughton, WI (US)

( * ) Notice: Subject to any disclaimer, the term of this patent is extended or adjusted under 35 U.S.C. 154(b) by 0 days.

(21) Appl. No.: 09/664,022

(22) Filed: Sep. 19, 2000

(51) Int. Cl.[7] .............................. B65D 8/04; B65D 41/06
(52) U.S. Cl. .......................... 55/385.3; 55/498; 55/502; 55/503; 55/504; 220/4.13; 220/293; 220/297; 220/300
(58) Field of Search ................................. 55/385.3, 498, 55/502, 503, 504; 220/4.07, 4.13, 4.21, 293, 297, 300

(56) References Cited

U.S. PATENT DOCUMENTS

| | | | |
|---|---|---|---|
| 4,215,790 A | * 8/1980 | Ribble et al. | ............... 220/240 |
| 4,261,718 A | 4/1981 | Garner | |
| 4,331,247 A | 5/1982 | Mumford | |
| 4,333,580 A | 6/1982 | Sweigart, Jr. | |
| 4,501,376 A | 2/1985 | Bushby | |
| 4,719,012 A | 1/1988 | Groezinger et al. | |
| 4,759,783 A | 7/1988 | Machado | |
| 5,049,170 A | 9/1991 | Parnoff | |
| 5,106,397 A | 4/1992 | Jaroszczyk et al. | |
| 5,114,572 A | 5/1992 | Hunter et al. | |
| 5,137,557 A | 8/1992 | Behrendt et al. | |
| 5,547,480 A | 8/1996 | Coulonvaux et al. | |
| 5,676,273 A | 10/1997 | Jonkers et al. | |
| 5,730,769 A | 3/1998 | Dungs et al. | |
| 5,755,842 A | 5/1998 | Patel et al. | |
| 5,800,581 A | 9/1998 | Gielink et al. | |
| 5,803,939 A | 9/1998 | Huning | |
| D407,475 S | 3/1999 | Coulonvaux et al. | |
| 5,876,600 A | 3/1999 | Matsubara et al. | |
| D412,567 S | 8/1999 | Ward et al. | |
| 5,948,246 A | 9/1999 | Zuk, Jr. | |
| 6,039,778 A | 3/2000 | Coulonvaux | |
| 6,051,042 A | 4/2000 | Coulonvaux | |

FOREIGN PATENT DOCUMENTS

| | | | |
|---|---|---|---|
| EP | 1093839 A1 | * | 10/2000 |
| FR | 2712506 | * | 11/1993 |
| GB | 2138411 | | 10/1984 |
| JP | 09173717 | * | 7/1997 |
| WO | WO 98/40147 | * | 9/1998 |

* cited by examiner

Primary Examiner—Richard L. Chiesa
Assistant Examiner—Minh-Chau T. Pham
(74) Attorney, Agent, or Firm—Andrus, Sceales, Starke & Sawall, LLP

(57) ABSTRACT

An air filter housing (12) includes twist and lock structure (42) having a first position (FIGS. 5, 7, 10) permitting axial movement (66) of a cover (34) and base (36) relative to each other, and being rotatable in a first rotational direction (44) from the first position to a second position (FIGS. 4, 6, 9, 12), and in the second position preventing axial movement of the base and cover relative to each other, and being rotatable in a second opposite rotational direction (64) from the second position to the first position. Anti-rotation lock structure (70, 110, 140) provides a rotational retention force holding the twist and lock structure in the second position. The anti-rotation lock structure includes an arm (74, 112, 142) flexibly bendable about a bend line extending parallel to the axis (14) of the housing.

20 Claims, 5 Drawing Sheets

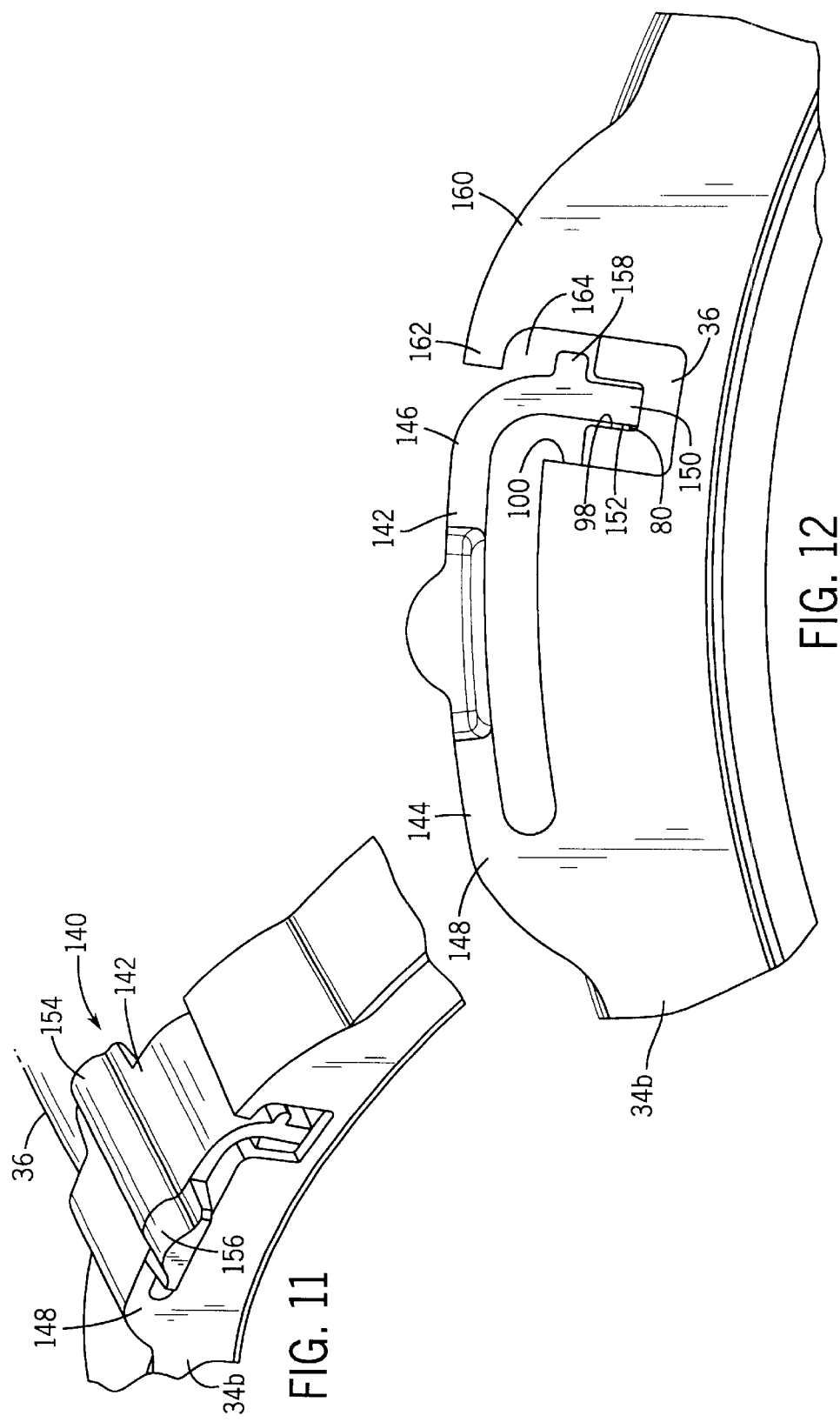

TWIST AND LOCK FILTER HOUSING WITH NONTORSIONAL ANTI-ROTATION STOP

BACKGROUND AND SUMMARY

The invention relates to filter housings, and more particularly to twist and lock filter housings, including plastic air cleaners.

Twist and lock filter housings are known in the prior art, including twist and lock plastic air cleaner housings. Such housings typically use nuts and bolts, overcenter latches, hinges, sliding lock components for anti-rotation, or a combination of these, to fasten the cover to the base.

The present invention provides a simple, cost effective system for locking the cover to the base in a twist and lock filter housing arrangement. In a desirable aspect, the invention enables a reduced number of components, and offers a cost advantage as well as simplicity over prior twist and lock systems using separate locking mechanisms.

In a further aspect, the invention provides in combination twist and lock structure providing an axial retention force and releasable anti-rotation lock structure providing a rotational retention force releasably holding the twist and lock structure in locked axially assembled condition. In one particularly desirable aspect, the invention enables both of such structures to be integral with their respective base or cover of a plastic air cleaner housing. This eliminates the expense of additional fasteners or components otherwise required to be attached to the base and/or cover.

In a further aspect, the invention provides anti-rotation lock structure having an arm stationarily mounted to the respective housing section and flexibly bendable about a bend line extending parallel to the housing axis.

BRIEF DESCRIPTION OF THE DRAWINGS

FIG. 11 is a perspective view like FIG. 8 and shows another embodiment.

FIG. 12 is an enlarged side sectional view of the structure of FIG. 11.

DETAILED DESCRIPTION

Figure 1:
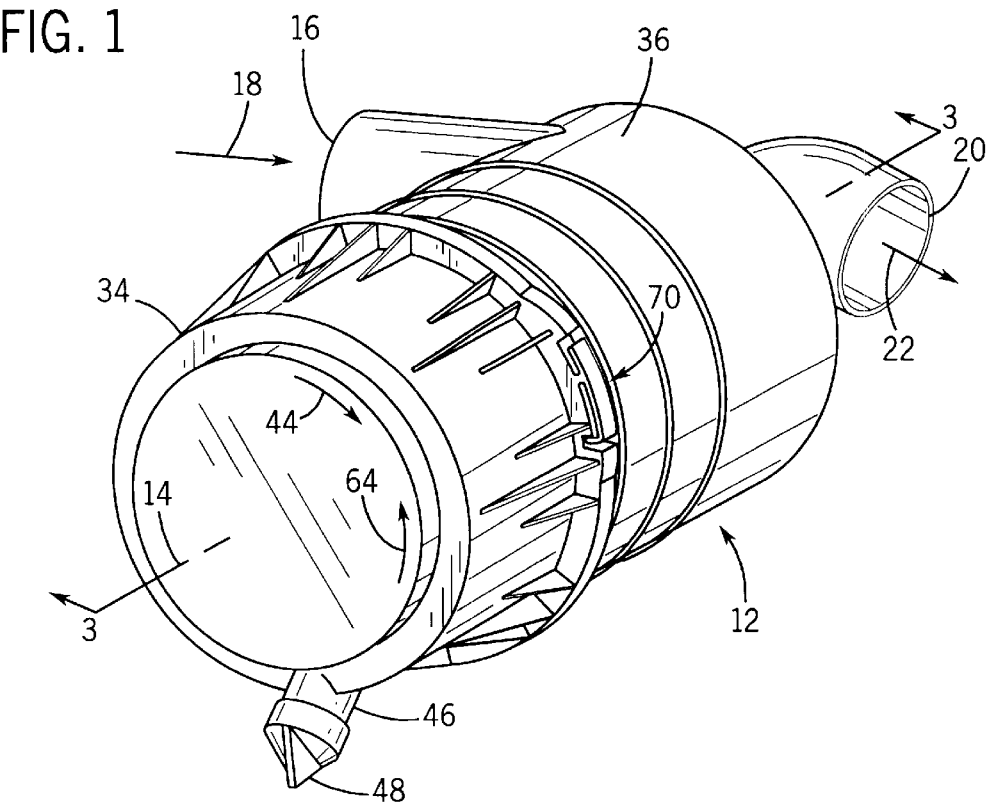
FIG. 1 is a perspective view of an assembled filter housing in accordance with the invention.

FIGS. 1–5 show a filter housing 12 extending along an axis 14 and having an air inlet 16 for receiving dirty air as shown at arrow 18, and an air outlet elbow 20 for discharging clean filtered air as shown at arrow 22. The dirty air flows into an annular space 24, FIG. 3, in the housing and then radially inwardly through annular filter element 26 into hollow interior 28 and then axially rightwardly in FIG. 3 through outlet 20. Filter element 26 is provided by an annulus of pleated filter media potted in distally opposite axial end caps 30 and 32 which are preferably formed of compressible material such as urethane, all as is known in the art. The housing has first and second mating housing sections provided by a cover 34 and base 36. Base 36 extends axially between distally opposite axial ends 38 and 40. Cover 34 is mounted to axial end 38 of the base by twist and lock structure 42, FIG. 2, to be described, providing an axial retention force holding base 36 and cover 34 in axial assembled condition upon axial movement of the base and cover towards each other followed by rotation in a first rotational direction 44, FIG. 4, about axis 14, e.g. rotation of cover 34 clockwise as shown at arrow 44 in FIG. 1. In the assembled condition, FIG. 3, end caps 30 and 32 are axially compressed to provide sealing and prevent bypass of dirty air from space 24 around the filter to hollow interior 28. Cover 34 engages and locates end cap 30, and base 36 engages and locates end cap 32. Cover 34 includes a drain outlet 46 with a drain valve 48 for discharging collected material, including liquid, from annular space 24, as is known.

Figure 2:
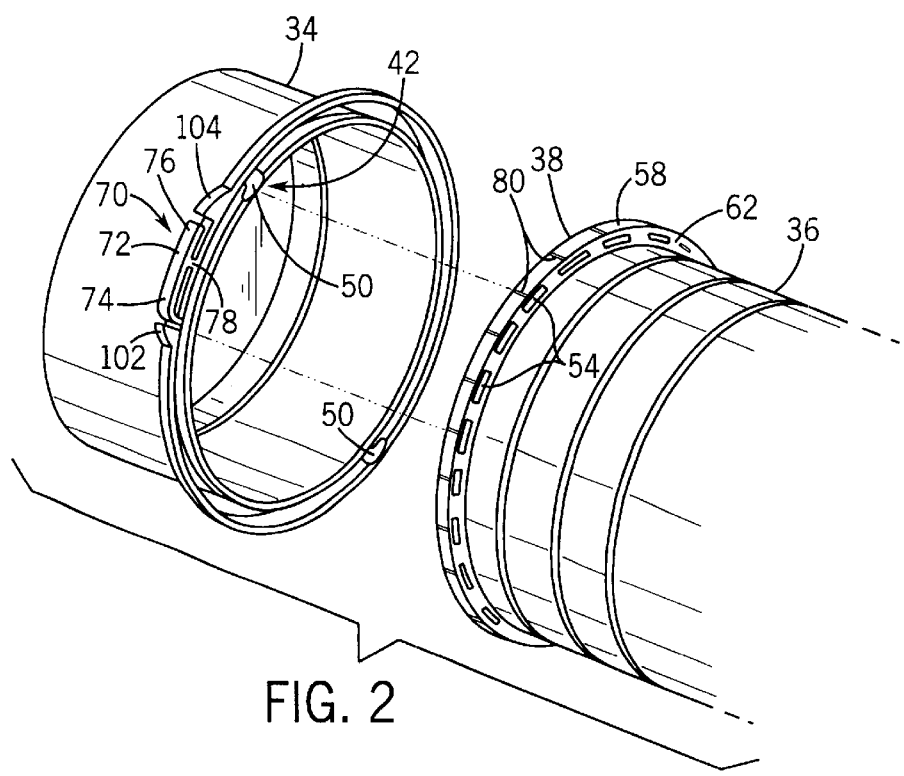
FIG. 2 is an exploded perspective view of a portion of the structure of FIG. 1.
Figure 3:
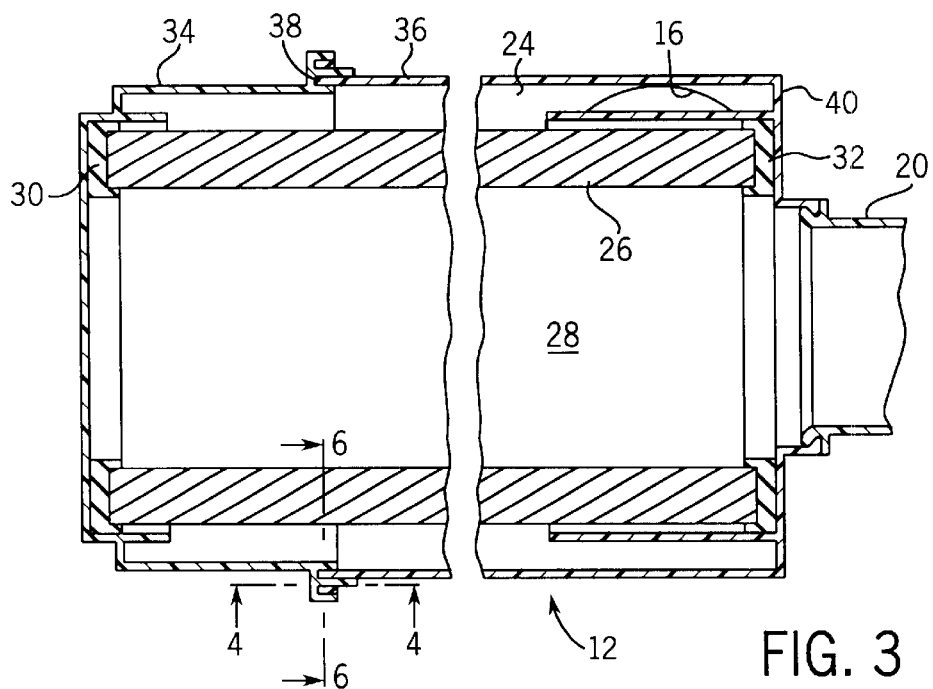
FIG. 3 is a sectional view taken along line 3—3 of FIG. 1.
Figure 4:
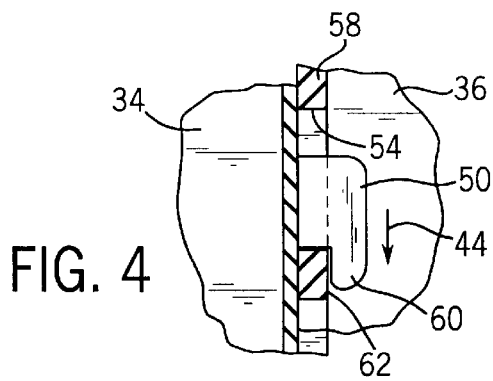
FIG. 4 is a sectional view taken along line 4—4 of FIG. 3, and shows the parts after twisting and locking.
Figure 5:
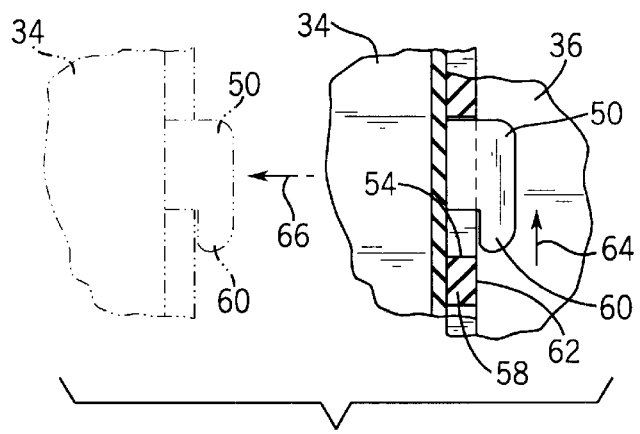
FIG. 5 is like FIG. 4 and shows the parts after return twisting and unlocking.

Twist and lock structure 42, FIG. 2, includes a plurality of hooks 50 on cover 34 engaging a respective one of a plurality of catches 54 on base 36. The catches are formed by respective through-slots in annular raised rim 58 at end 38 of base 36. Cover 34 is slid axially rightwardly in FIG. 2 such that hook 50 passes axially through slot 54, and the remaining hooks pass through their respective mating slots, and then cover 34 is turned or twisted to rotate about axis 14, arrow 44, FIGS. 1 and 4, so that tip 60, FIG. 4, of hook 50 slides along and behind the axially rightwardly facing rear surface 62 of rim 58, and such that the tips of remaining hooks slide along and behind the axially rightwardly facing rear surface 62 of rim 58. The number of hooks may be varied to provide a desired axial retention force balanced around the circumference of the housing. In an alternative, the hooks can be provided on base 36, and the catches on cover 34. The noted axial insertion of cover 34 onto base 36 followed by rotation provides twist and lock operation providing an axial retention force holding the base and cover in axial assembled condition. The twist and lock structure has a first position, FIG. 5, permitting axial movement of the base and cover relative to each other. The twist and lock structure is rotatable in a first rotational direction 44 from the first position to a second position, FIG. 4. The twist and lock structure in the second position, FIG. 4, prevents axial movement of the base and cover relative to each other. The twist and lock structure is rotatable in a second rotational direction 64, FIG. 5, from the locked second position to the unlocked first position. Rotational direction 64 is opposite to rotational direction 44. Referring to FIGS. 1, 4 and 5, cover 34 is rotated along rotational direction 44 to the second locking position, and is rotated along rotational direction 64 to the first unlocking position. In the unlocked position, cover 34 may be axially removed from base 36, as shown at axial leftward arrow 66 in FIG. 5.

Anti-rotation lock structure 70, FIGS. 1, 2, provides a rotational retention force holding the twist and lock structure in the noted locked second position. The anti-rotation lock structure is provided by a teeter-totter 72 having a pair of oppositely extending arms 74 and 76 integrally joined to each other and integrally mounted to and formed as part of cover 34 at fulcrum 78. Arm 74 extends partially circumferentially along cover 34 and releasably engages base 36 at a respective one of a plurality of slots 80 in raised annular rim 58 of the base and applies a rotational retention force in a direction along arm 74 tangent to the noted arc of rotation and holding the twist and lock structure 42 in the noted locked second position, FIGS. 6 and 4.

Figure 6:
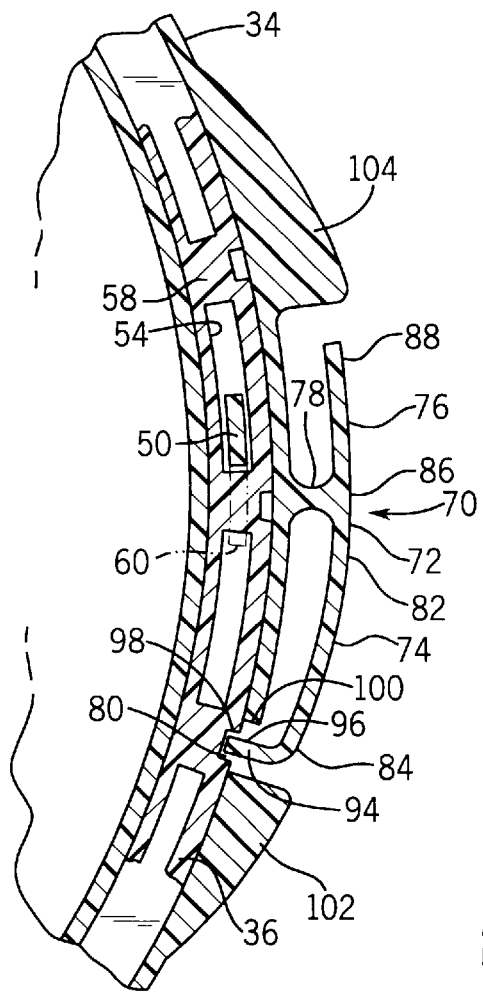
FIG. 6 is a sectional view taken along line 6—6 of FIG. 3.

Arm 74 extends between first and second circumferentially spaced ends 82 and 84, FIG. 6. End 82 is stationarily integrally mounted to cover 34 at fulcrum 78. Arm 74 flexes along a bend line at fulcrum 78, FIG. 7, which bend line is parallel to axis 14 and perpendicular to the noted arc of rotation and to the noted retention force direction. Arm 76 extends partially circumferentially along the noted arc of rotation between first and second circumferentially spaced ends 86 and 88. End 86 is common with end 82 and stationarily integrally mounted to cover 34 at fulcrum 78. Arm 76 extends from fulcrum 78 oppositely from arm 74 to form teeter-totter 72. Radial inward depression of end 88 of arm 76, as shown at arrow 90 in FIG. 7, causes radial outward movement of end 84 of arm 74, as shown at arrow 92, to release twist and lock structure 42 to rotate from the noted second locked position, FIGS. 4, 6, to the noted first unlocked position, FIGS. 5, 7.

Arm 74 at end 84 has a hook portion 94 having a stop surface 96 extending radially relative to axis 14 and facing toward end 82 of arm 74. Base 36 has a stop surface 98 extending radially relative to axis 14 and facing away from end 82 of arm 74. Stop surfaces 96 and 98 engage each other in the noted second locked position of twist and lock structure 42 to provide the noted rotational retention force. Arm 74 is manually releasable to flex about the noted bend line at fulcrum 78 to disengage stop surfaces 96 and 98, FIG. 7, by moving stop surface 96 radially outwardly, as shown at arrow 92, out of the path of movement of stop surface 98 in slot or groove 80 of raised annular rim 58 of base 36, to permit rotation of twist and lock structure 42 from the second locking position, FIGS. 6, 4, to the first unlocked position, FIGS. 5, 7.

Figure 7:
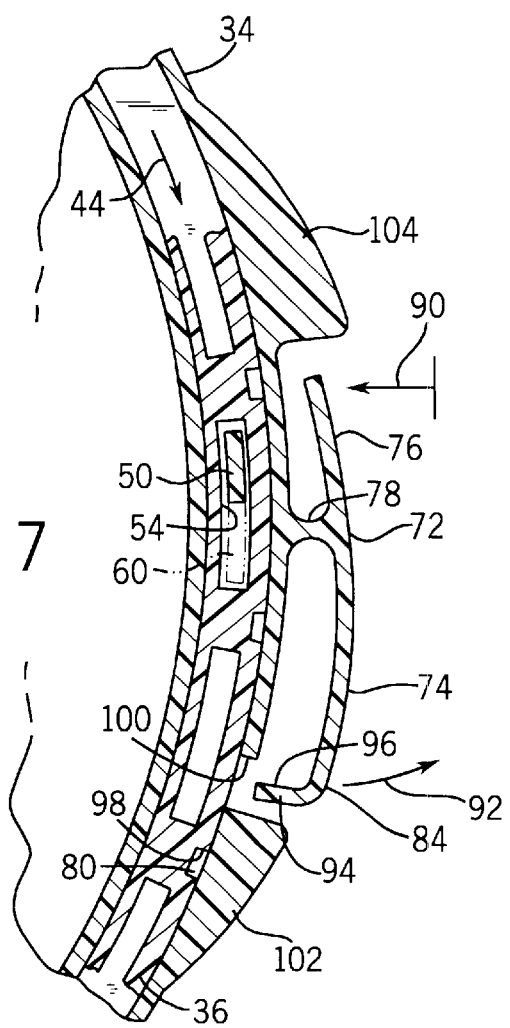
FIG. 7 is like FIG. 6 and shows release of the anti-rotation lock structure.

Cover 34 has a slot or groove 100, FIG. 7, radially aligned with and receiving hook portion 94 of arm 74 therein. Base 36 has a plurality of the previously noted slots or grooves 80 facing radially outwardly from raised annular rim 58 and axially alignable with slot 100 during rotation of the cover and base. Hook portion 94 of arm 74 extends into slot 100 and a respective one of slots 80 to provide the noted rotational retention force holding twist and lock structure 42 in the second locked position, FIGS. 4, 6. Arm 74 is manually flexed about the bend line at fulcrum 78 to move hook portion 94 radially outwardly out of slot 80 to permit rotation of the twist and lock structure from the noted second locked position to the noted first unlocked position. Arm 74 may be manually flexed radially outwardly as shown at arrow 92, FIG. 7, by radially inwardly depressing arm 76 as shown at arrow 90, or by gripping arm 74 with the user's fingers and pulling it radially outwardly. A pair of protective side shrouds 102 and 104, FIGS. 2, 6, extend radially outwardly from cover 34 adjacent respective arms 74 and 76 to prevent accidental unintentional release thereof. Protective side shroud 102 is adjacent end 84 of arm 74 and is circumferentially spaced therefrom. Protective side shroud 104 is adjacent end 88 of arm 76 and is circumferentially spaced therefrom.

Figure 8:
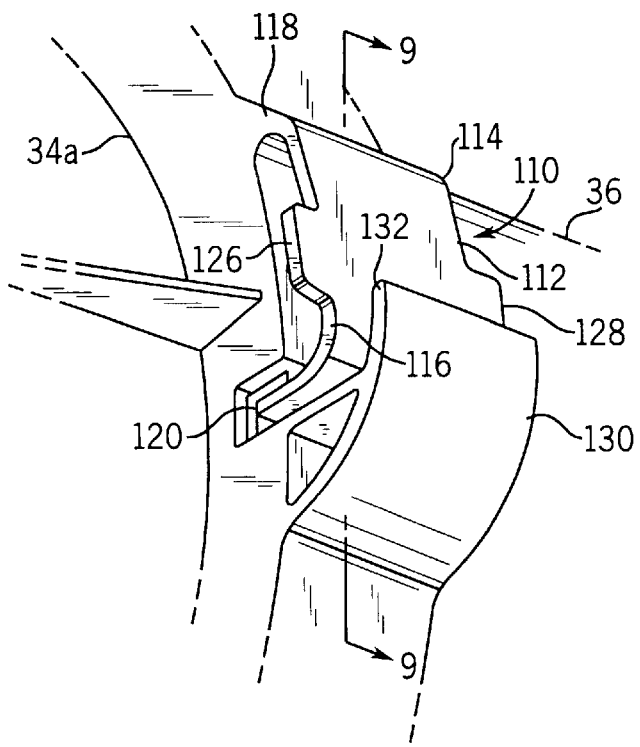
FIG. 8 is a perspective view of a portion of FIG. 1 and shows an alternate embodiment.
Figure 9:
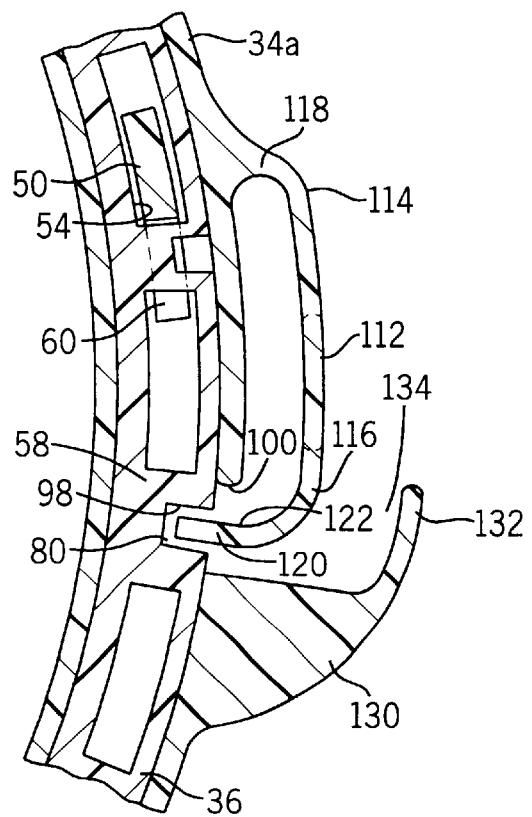
FIG. 9 is a sectional view taken along line 9—9 of FIG. 8.
Figure 10:
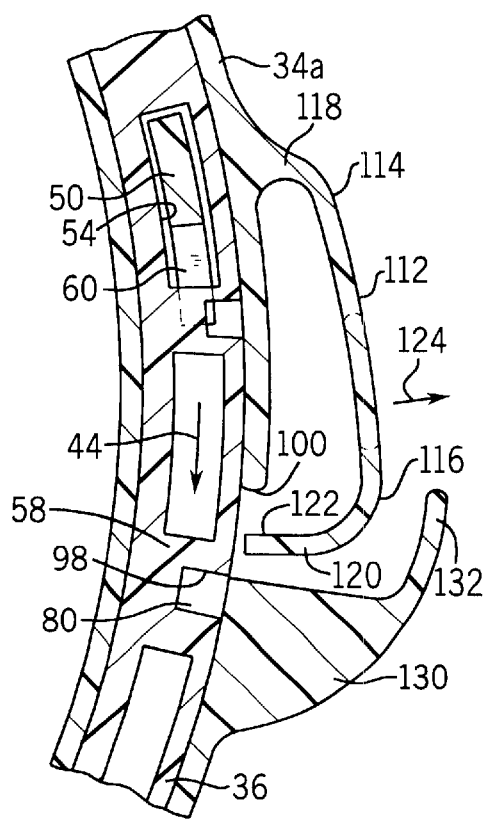
FIG. 10 is like FIG. 9 and shows release of the anti-rotation lock structure.

FIGS. 8–10 show an alternate embodiment and use like reference numerals from above where appropriate to facilitate understanding. FIGS. 8–10 show alternate anti-rotation lock structure 110 provided by a cantilever arm 112 having a first root end 114 and a second free end 116. Arm 112 extends partially circumferentially along cover 34a along the arc of rotation thereof and releasably engages base 36 and applies a rotational retention force in a direction along the arm tangent to the noted arc of rotation and holding twist and lock structure 42 in the noted second locked position, FIGS. 4, 9, comparably to arm 74. Arm 112 extends between circumferentially spaced ends 114 and 116. End 114 is stationarily integrally mounted to cover 34a at hinge 118, comparably to fulcrum 78. Arm 112 flexes along a bend line at hinge 118, FIG. 10, which bend line is parallel to axis 14 and perpendicular to the noted arc of rotation and the noted retention force direction.

Free end 116 of arm 112 has a hook portion 120, FIG. 9, engaging base 36. Hook portion 120 has a stop surface 122 extending radially relative to axis 14 and facing toward end 114 of arm 112. Base 36 has the noted stop surface 98 extending radially relative to axis 14 and facing away from end 114 of arm 112. Stop surfaces 122 and 98 engage each other in the noted second locked position of twist and lock structure 42, FIGS. 4, 9, to provide the noted rotational retention force. Arm 112 is manually releasable to flex about the noted bend line to disengage stop surfaces 122 and 98, FIG. 10, by moving stop surface 122 radially outwardly, as shown at arrow 124 in FIG. 10, out of the path of movement of stop surface 98, to permit rotation of the twist and lock structure from the second locked position, FIGS. 4, 9, to the first unlocked position, FIGS. 5, 10. A pair of distally opposite gripper wings 126 and 128, FIG. 8, extend axially from arm 112 for manual engagement by the fingers of the user and radial outward pulling of free end 116 of the arm to release the twist and lock structure to rotate from the second locked position to the first unlocked position. Slot 100 in cover 34a is radially aligned with and receives hook portion 120 therein. Slots or grooves 80 in raised annular rim 58 of base 36 are axially alignable with slot 100 during rotation of the cover and base. Hook portion 120 extends into slot 100 and a respective one of slots 80 to provide the noted rotational retention force holding the twist and lock structure in the second locked position. Arm 112 is manually flexed about the noted bend line to move hook portion 120 radially outwardly, as shown at arrow 124 in FIG. 10, out of slot 80 to permit rotation of the twist and lock structure from the second locked position to the first unlocked position.

A protective side shroud 130, FIGS. 8–10, extends radially outwardly from cover 34a adjacent arm 112 to prevent accidental unintentional release thereof. Shroud 130 is adjacent free end 116 of arm 112 and is circumferentially spaced therefrom. Shroud 130 includes an outer guard portion 132 extending partially circumferentially along the noted arc of rotation and spaced radially outwardly of arm 112 and limiting the radial outward travel of arm 112 to prevent overbending thereof. Guard portion 132 is spaced radially outwardly beyond arm 112 by a gap 134 having a radial height greater than the radial depth of insertion of hook portion 120 into respective slot 80.

FIGS. 11 and 12 show another alternate embodiment and use like reference numerals from above where appropriate to facilitate understanding. FIGS. 11 and 12 show alternate anti-rotation lock structure 140 provided by a cantilever arm 142 having a first root end 144 and a second free end 146. Arm 142 extends partially circumferentially along cover 34b along the arc of rotation thereof and releasably engages base 36 and applies a rotational retention force in a direction along the arm tangent to the noted arc of rotation and holding twist and lock structure 42 in the noted second locked position, FIGS. 4, 6, 9, 12, comparably to arms 74 and 112. Arm 142 extends between circumferentially spaced ends 144 and 146. End 144 is stationarily integrally mounted to cover 34b at hinge 148, comparably to fulcrum 78 and hinge 118. Arm 142 flexes along a bend line at hinge 148, which bend line is parallel to axis 14 and perpendicular to the noted arc of rotation and the noted retention force direction.

Free end 146 of arm 142 has a hook portion 150 engaging base 36. Hook portion 150 has a stop surface 152 extending radially relative to axis 14 and facing toward end 144 of arm 142. Base 36 has the noted stop surface 98 extending radially relative to axis 14 and facing away from end 144 of arm 142. Stop surfaces 152 and 98 engage each other in the noted second locked position of twist and lock structure 42, FIGS. 4, 6, 9, 12, to provide the noted rotational retention force. Arm 142 is manually releasable to flex about the noted bend line to disengage stop surfaces 152 and 98 by moving stop surface 152 radially outwardly out of the path of movement of stop surface 98, to permit rotation of the twist and lock structure from the second locked position, FIGS. 4, 6, 9, 12, to the first unlocked position, FIGS. 5, 7, 10. A pair of distally opposite gripper wings 154, 156 extend axially from arm 142 for manual engagement by the fingers of the user and radial outward pulling of free end 146 of the arm to release the twist and lock structure to rotate from the second locked position to the first unlocked position. Slot 100 in cover 34b is radially aligned with and receives hook portion 150 therein. Slots or grooves 80 in raised annular rim 58 of base 36 are axially alignable with slot 100 during rotation of the cover and base. Hook portion 150 extends into slot 100 and a respective one of slots 80 to provide the noted rotational retention force holding the twist and lock structure in the second locked position. Arm 142 is manually flexed about the noted bend line to move hook portion 150 radially outwardly out of slot 80 to permit rotation of the twist and lock structure from the second locked position to the first unlocked position.

Hook portion 150 of arm 142 has a projection 158, FIG. 12, extending therefrom. A protective side shroud 160 extends radially outwardly from cover 34b adjacent arm 142 to prevent accidental unintentional release thereof. Shroud 160 is adjacent free end 146 of arm 142 and is circumferentially spaced therefrom. Shroud 160 includes an outer guard portion 162 having a radial height substantially no greater than arm 142 in the noted second locked position, FIG. 12. Guard portion 162 is spaced radially outwardly of and lies in the path of radial outward movement of projection 158 and limits the radial outward travel of arm 142 to prevent overbending thereof. Guard portion 162 is spaced radially outwardly beyond projection 158 by a gap 164 having a radial height greater than the radial depth of insertion of hook portion 150 into slot 80. Guard portion 162 is circumferentially aligned with and spaced from arm 142.

Each of the described anti-rotation lock structures 70, 110, 140 includes an arm 74, 112, 142 stationarily mounted to the cover. Alternatively, the arm may be mounted to base 36. The arm is flexibly bendable about a bend line 78, 118, 148 extending parallel to axis 14. The arm has a hook portion 94, 120, 150 engageable with the mating housing section and applying a rotational retention force stopping rotation of the twist and lock structure 42 from the noted second locked position, FIGS. 4, 6, 9, 12 to the first unlocked position, FIGS. 5, 7, 10. The direction of force is along the arm 74, 112, 142 for enhanced strength, rather than transverse thereto which may otherwise cause torsional twisting of the arm along a torsional twist line other than the bend line 78, 118, 148. The noted direction of retention force is perpendicular to such bend line.

It is recognized that various equivalents, alternatives and modifications are possible within the scope of the appended claims.

What is claimed is:

1. A filter housing extending along an axis comprising first and second mating housing sections, one of said housing sections being a base extending axially between distally opposite axial ends, the other of said housing sections being a cover mounted to one of said axial ends of said base by twist and lock structure providing an axial retention force holding said base and cover in axial assembled condition upon axial movement of said base and cover towards each other followed by rotation in a first rotational direction about said axis, said twist and lock structure having a first position permitting axial movement of said base and cover relative to each other, said twist and lock structure being rotatable in said first rotational direction from said first position to a second position, said twist and lock structure in said second position preventing axial movement of said base and cover relative to each other, said twist and lock structure being rotatable in a second rotational direction from said second position to said first position, said second rotational direction being opposite to said first rotational direction, anti-rotation lock structure comprising an arm mounted to said first housing section and extending partially circumferentially therealong along an arc of said rotation and releasably engaging said second housing section and applying a rotational retention force in a direction along said arm tangent to said arc and holding said twist and lock structure in said second position, wherein said arm extends between first and second circumferentially spaced ends, said first end is stationarily integrally mounted to said first housing section and said arm flexes along a bend line parallel to said axis.

2. The invention according to claim 1 wherein said bend line is perpendicular to said arc.

3. The invention according to claim 2 wherein said bend line is perpendicular to said retention force direction.

4. The invention according to claim 3 wherein said second end of said arm has a hook portion engaging said second housing section, said hook portion has a first stop surface extending radially relative to said axis and faces toward said first end of said arm, said second housing section has a second stop surface extending radially relative to said axis and faces away from said first end of said arm, said first and second stop surfaces engage each other in said second position of said twist and lock structure to provide said rotational retention force, said arm is manually releasable to flex about said bend line to disengage said first and second stop surfaces by moving said first stop surface radially outwardly out of the path of movement of said second stop surface to permit rotation of said twist and lock structure from said second position to said first position.

5. The invention according to claim 4 wherein said first housing section has a first slot radially aligned with and receiving said hook portion therein, said second housing section has a second slot axially alignable with said first slot during rotation of said first and second housing sections, said hook portion extends into said first slot and said second slot to provide said rotational retention force holding said twist and lock structure in said second position, said arm being manually flexed about said bend line to move said hook portion radially outwardly out of said second slot to permit rotation of said twist and lock structure from said second position to said first position.

6. The invention according to claim 5 comprising a protective side shroud extending radially outwardly from said first housing section adjacent said arm to prevent accidental unintentional release thereof.

7. The invention according to claim 6 wherein said shroud is circumferentially spaced from said arm.

8. The invention according to claim 6 wherein said shroud includes an outer guard portion extending partially circumferentially along said arm and spaced radially outwardly of said arm and limiting the radial outward travel of said arm to prevent overbending thereof.

9. The invention according to claim 8 wherein said guard portion is spaced radially outwardly beyond said arm by a gap having a radial height greater than the radial depth of insertion of said hook portion into said second slot.

10. The invention according to claim 6 wherein said hook portion of said arm has a projection extending therefrom, and wherein said shroud includes an outer guard portion having a radial height substantially no greater than said arm in said second position, said guard portion spaced radially outwardly of and lying in the path of radial outward movement of said projection and limiting the radial outward travel of said arm to prevent overbending thereof.

11. The invention according to claim 10 wherein said guard portion is circumferentially aligned with and spaced from said arm.

12. The invention according to claim 10, wherein said guard portion is spaced radially outwardly beyond said projection by a gap having a radial height greater than the radial depth of insertion of said hook portion into said second slot.

13. A filter housing extending along an axis comprising first and second mating housing sections, one of said housing sections being a base extending axially between distally opposite axial ends, the other of said housing sections being a cover mounted to one of said axial ends of said base by twist and lock structure providing an axial retention force holding said base and cover in axial assembled condition upon axial movement of said base and cover towards each other followed by rotation in a first rotational direction about said axis, said twist and lock structure having a first position permitting axial movement of said base and cover relative to each other, said twist and lock structure being rotatable in said first rotational direction from said first position to a second position, said twist and lock structure in said second position preventing axial movement of said base and cover relative to each other, said twist and lock structure being rotatable in a second rotational direction from said second position to said first position, said second rotational direction being opposite to said first rotational direction, anti-rotation lock structure comprising an arm mounted to said first housing section and extending partially circumferentially therealong along an arc of said rotation and releasably engaging said second housing section and applying a rotational retention force in a direction along said arm tangent to said arc and holding said twist and lock structure in said second position, said arm extending between first and second circumferentially spaced ends, said first end being stationarily integrally mounted to said first housing section, said arm flexing along a bend line parallel to said axis and perpendicular to said arc and said retention force direction, and comprising a second arm extending partially circumferentially along said arc between first and second circumferentially spaced ends, said first end of said second arm being common with said first end of said first mentioned arm and stationarily integrally mounted to said first housing section at a fulcrum, said second arm extending from said fulcrum oppositely from said first arm to form a teeter-totter such that radial inward depression of said second end of said second arm causes radial outward movement of said second end of said first arm to release said twist and lock structure to rotate from said second position to said first position.

14. The invention according to claim 13 comprising a first protective side shroud extending radially outwardly from said first housing section adjacent said second end of said first arm, and a second protective side shroud extending radially outwardly from said first housing section adjacent said second end of said second arm.

15. A filter housing extending along an axis comprising first and second mating housing sections, one of said housing sections being a base extending axially between distally opposite axial ends, the other of said housing sections being a cover mounted to one of said axial ends of said base by twist and lock structure providing an axial retention force holding said base and cover in axial assembled condition upon axial movement of said base and cover towards each other followed by rotation in a first rotational direction about said axis, said twist and lock structure having a first position permitting axial movement of said base and cover relative to each other, said twist and lock structure being rotatable in said first rotational direction from said first position to a second position, said twist and lock structure in said second position preventing axial movement of said base and cover relative to each other, said twist and lock structure being rotatable in a second rotational direction from said second position to said first position, said second rotational direction being opposite to said first rotational direction, anti-rotation lock structure comprising an arm mounted to said first housing section and extending partially circumferentially therealong along an arc of said rotation and releasably engaging said second housing section and applying a rotational retention force in a direction along said arm tangent to said arc and holding said twist and lock structure in said second position, said arm extending between first and second circumferentially spaced ends, said first end being stationarily integrally mounted to said first housing section, said arm flexing along a bend line parallel to said axis and perpendicular to said arc and said retention force direction, said arm being a cantilever arm having a root end at said first end and a free end at said second end, and comprising a pair of distally opposite gripper wings extending axially from said arm for manual engagement and radial outward pulling of said second end of said arm to release said twist and lock structure to rotate from said second position to said first position.

16. The invention according to claim 15 comprising a protective side shroud extending radially outwardly from said first housing section adjacent said arm to prevent accidental unintentional release thereof, said shroud including an outer guard portion extending partially circumferentially along said arc and spaced radially outwardly of said arm and limiting the radial outward travel of said arm to prevent overbending thereof.

17. The invention according to claim 15 wherein said hook portion of said arm has a projection extending therefrom, and wherein said shroud includes an outer guard portion circumferentially aligned with and spaced from said arm and spaced radially outwardly of and lying in the path of radial movement of said projection and limiting the radial outward travel of said arm to prevent overbending thereof.

18. The invention according to claim 15 wherein said hook portion of said arm has a projection extending therefrom, and wherein said shroud includes an outer guard portion having a radial height substantially no greater than said arm in said second position, said guard portion spaced radially outwardly of and lying in the path of radial outward movement of said projection and limiting the radial outward travel of said arm to prevent overbending thereof.

19. A filter housing extending along an axis comprising first and second mating housing sections, one of said housing sections being a base extending axially between distally opposite axial ends, the other of said housing sections being a cover mounted to one of said axial ends of said base by twist and lock structure providing an axial retention force holding said base and cover in axial assembled condition upon axial movement of said base and cover towards each other followed by rotation in a first rotational direction about said axis, said twist and lock structure having a first position permitting axial movement of said base and cover relative to each other, said twist and lock structure being rotatable in said first rotational direction from said first position to a second position, said twist and lock structure in said second position preventing axial movement of said base and cover relative to each other, said twist and lock structure being rotatable in a second rotational direction from said second position to said first position, said second rotational direction being opposite to said first rotational direction, anti-rotation lock structure comprising an arm stationarily mounted to said first housing section and flexibly bendable along a bend line extending parallel to said axis, said arm having a hook portion engageable with said second housing section and applying a rotational retention force stopping rotation of said twist and lock structure from said second position to said first position, the direction of said force being along said arm for enhanced strength, rather than transverse thereto which may otherwise cause torsional twisting of said arm along a torsional twist line other than said bend line.

20. The invention according to claim 19 wherein said direction of said force is perpendicular to said bend line.

\* \* \* \* \*